July 17, 1934.  T. W. SMALL ET AL  1,966,692
AUTOMATIC PHONOGRAPH
Filed Sept. 25, 1931   14 Sheets-Sheet 1

Inventors
T. W. Small and
S. A. Guest
By Hull, Brock & West
Attorneys

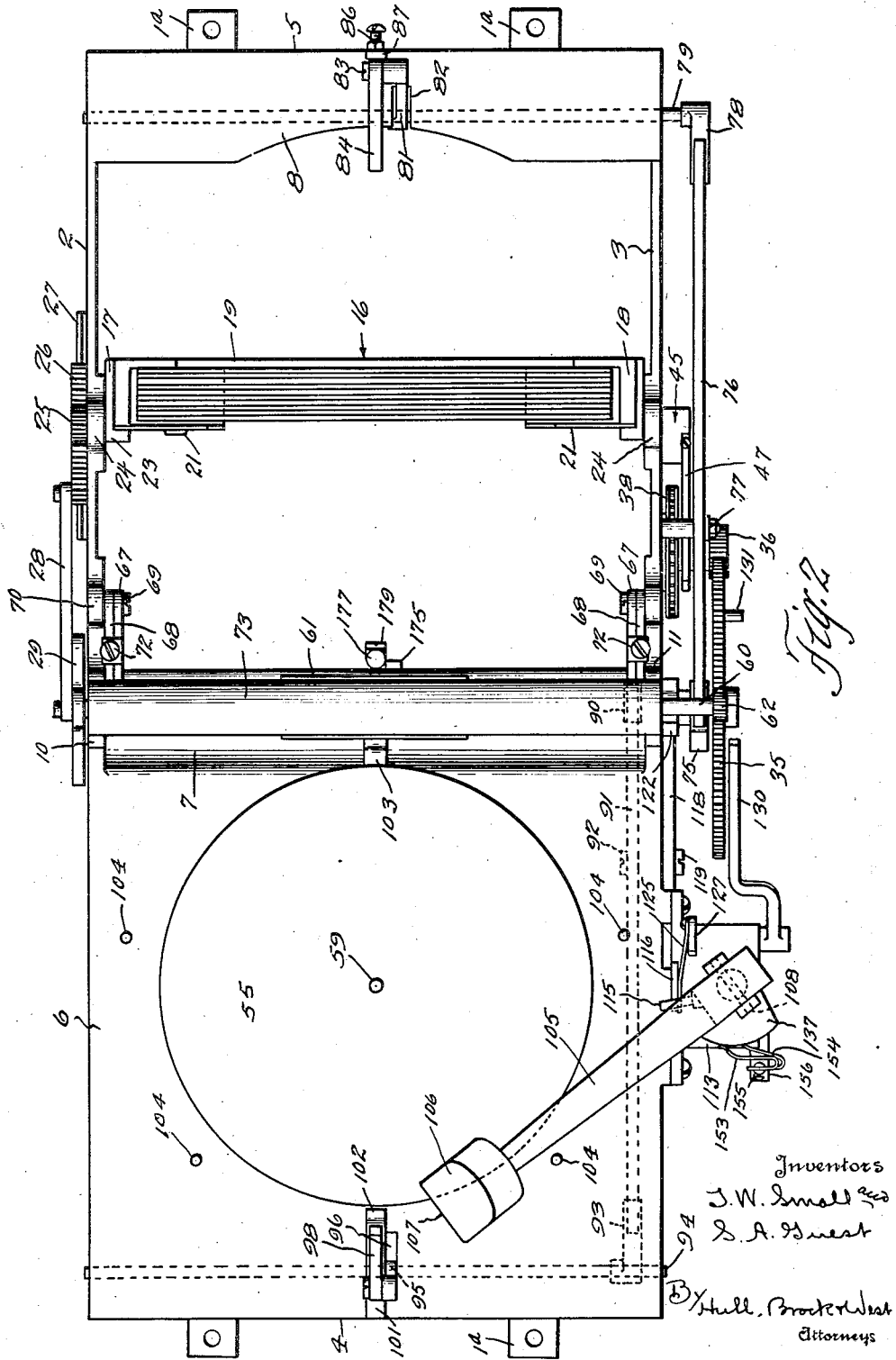

July 17, 1934.     T. W. SMALL ET AL     1,966,692
AUTOMATIC PHONOGRAPH
Filed Sept. 25, 1931     14 Sheets-Sheet 3
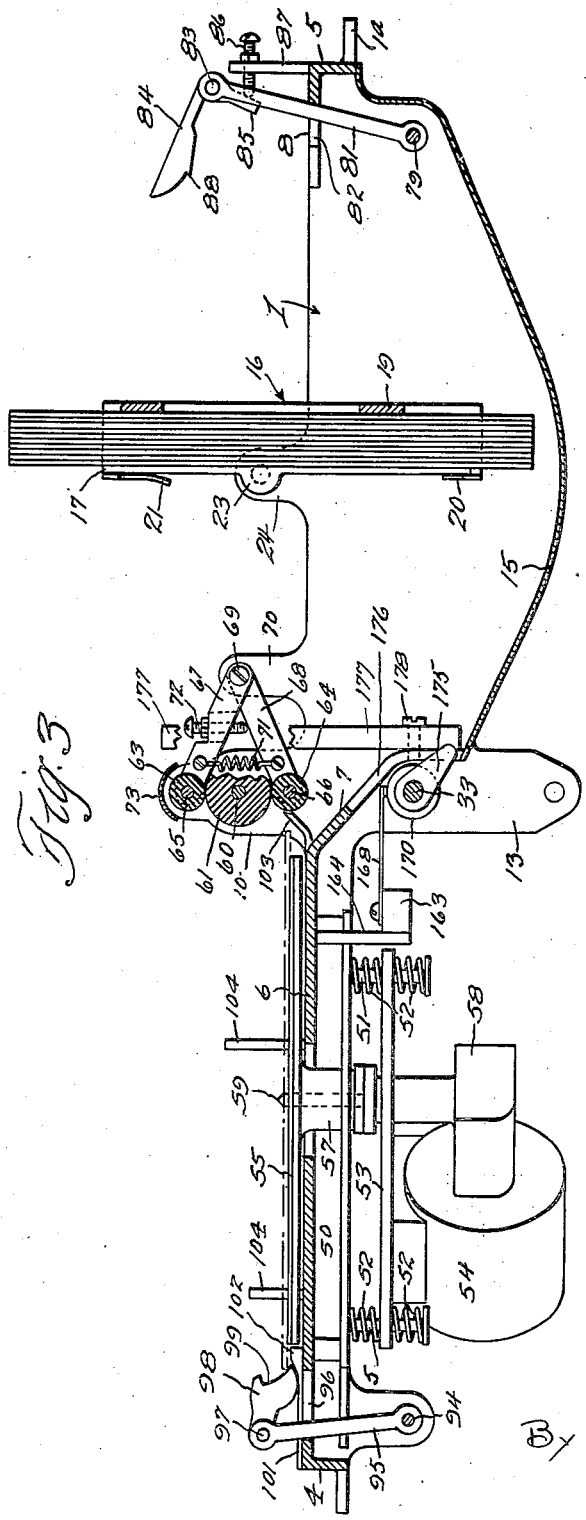
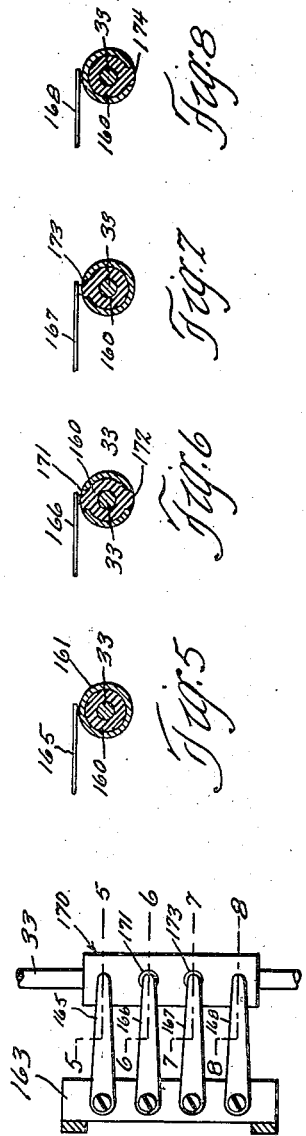

July 17, 1934.    T. W. SMALL ET AL    1,966,692
AUTOMATIC PHONOGRAPH
Filed Sept. 25, 1931    14 Sheets-Sheet 4

July 17, 1934.    T. W. SMALL ET AL    1,966,692
AUTOMATIC PHONOGRAPH
Filed Sept. 25, 1931    14 Sheets-Sheet 5
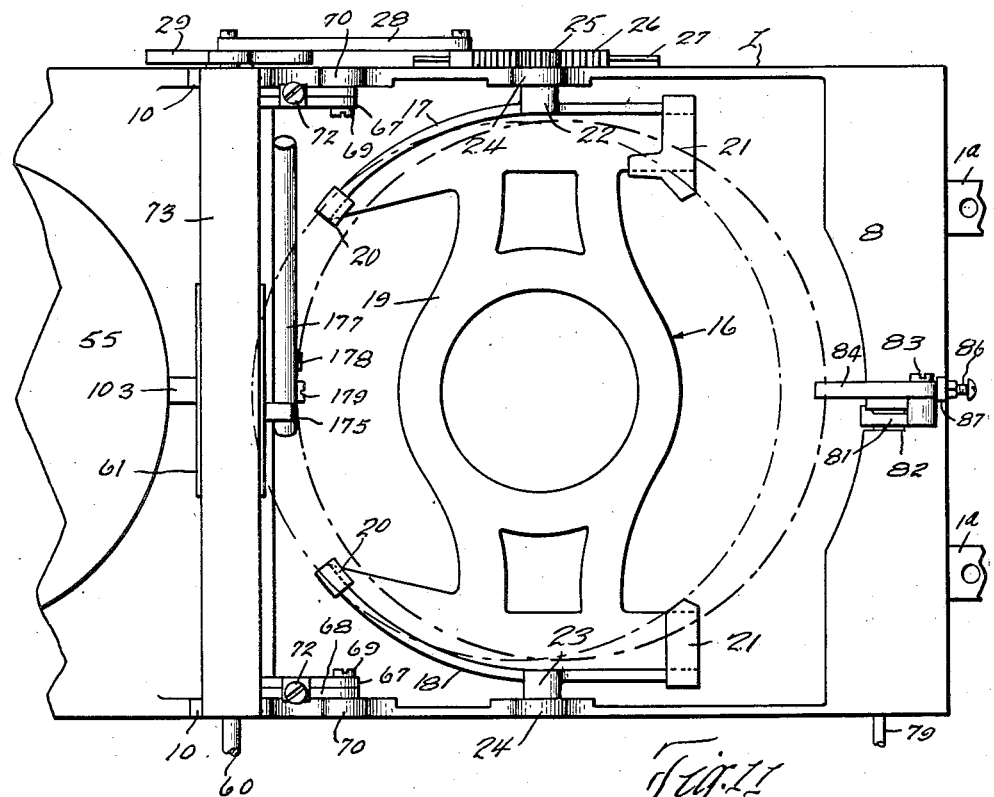
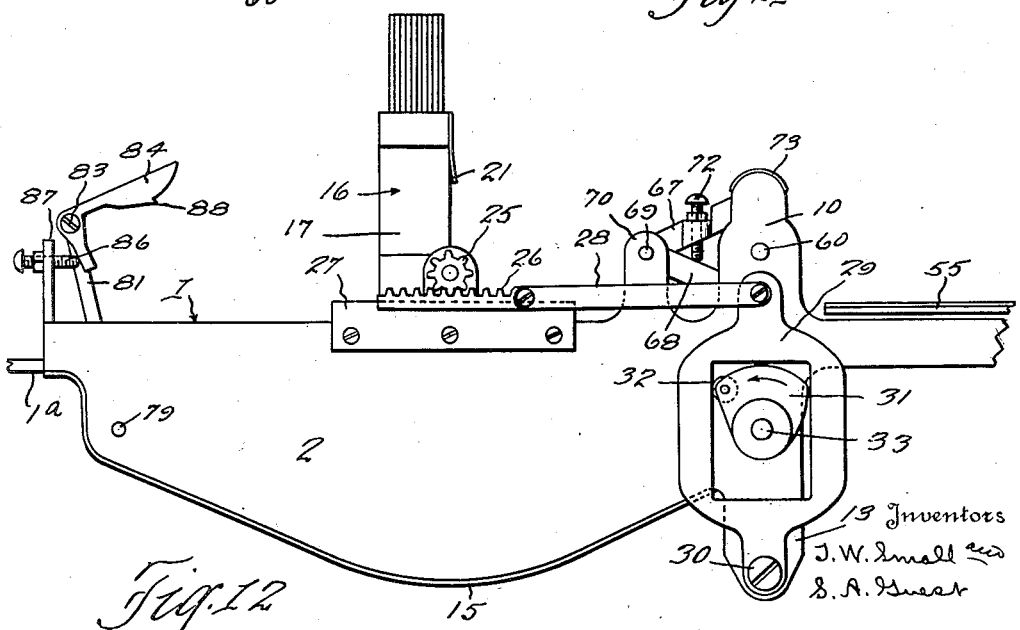
Inventors
T. W. Small
S. A. Guest
By Hull, Brock & West
Attorneys

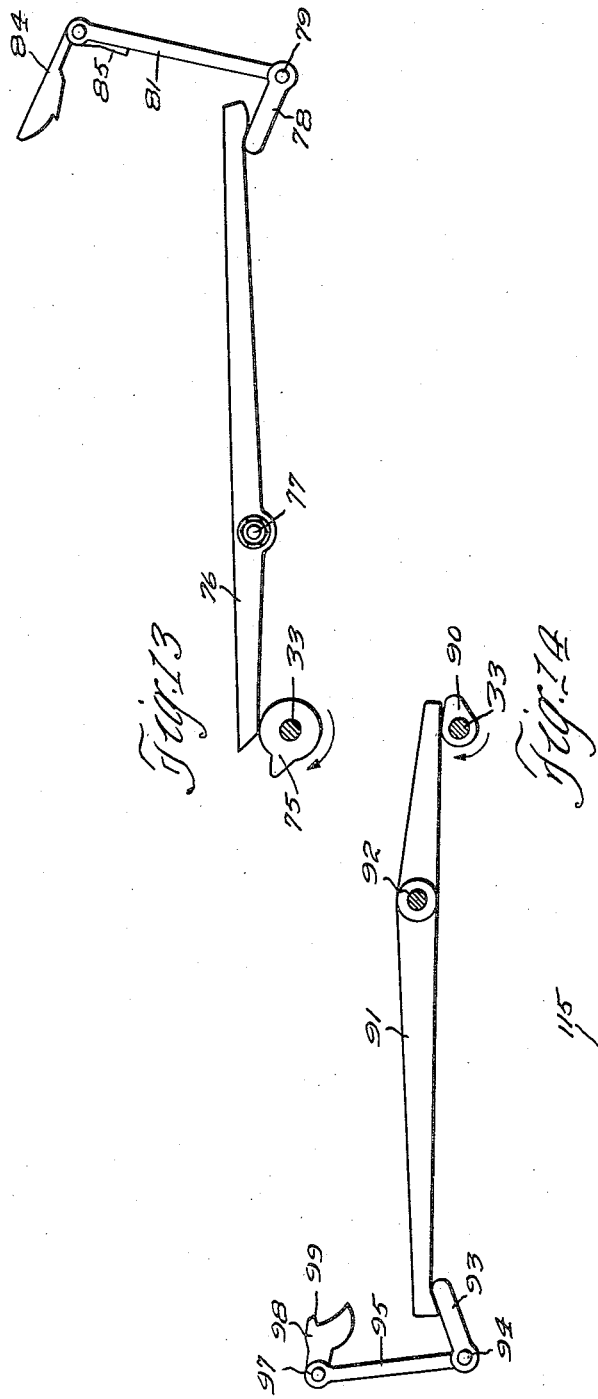

July 17, 1934.   T. W. SMALL ET AL   1,966,692
AUTOMATIC PHONOGRAPH
Filed Sept. 25, 1931   14 Sheets-Sheet 7

Inventors
T. W. Small
S. A. Guest

By Stull, Brock & West
Attorneys

July 17, 1934.  T. W. SMALL ET AL  1,966,692
AUTOMATIC PHONOGRAPH
Filed Sept. 25, 1931  14 Sheets-Sheet 8
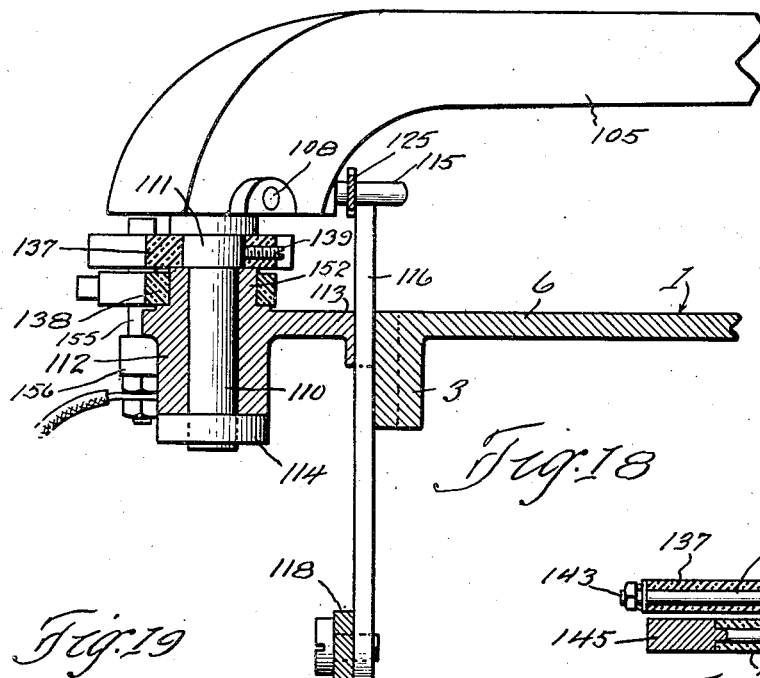
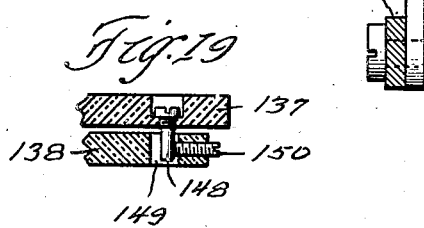
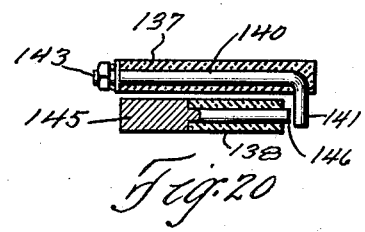
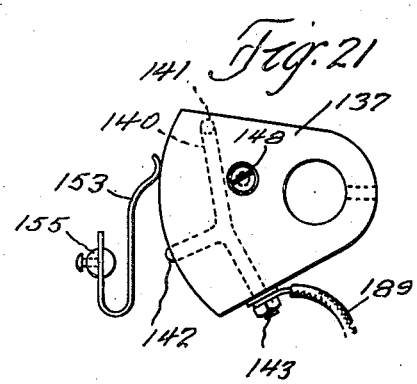
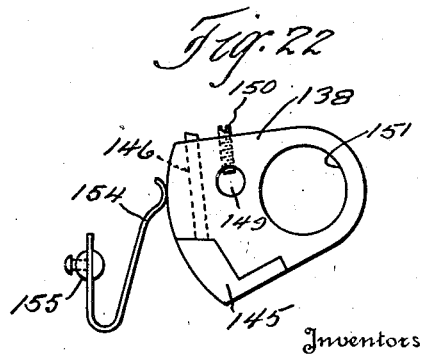

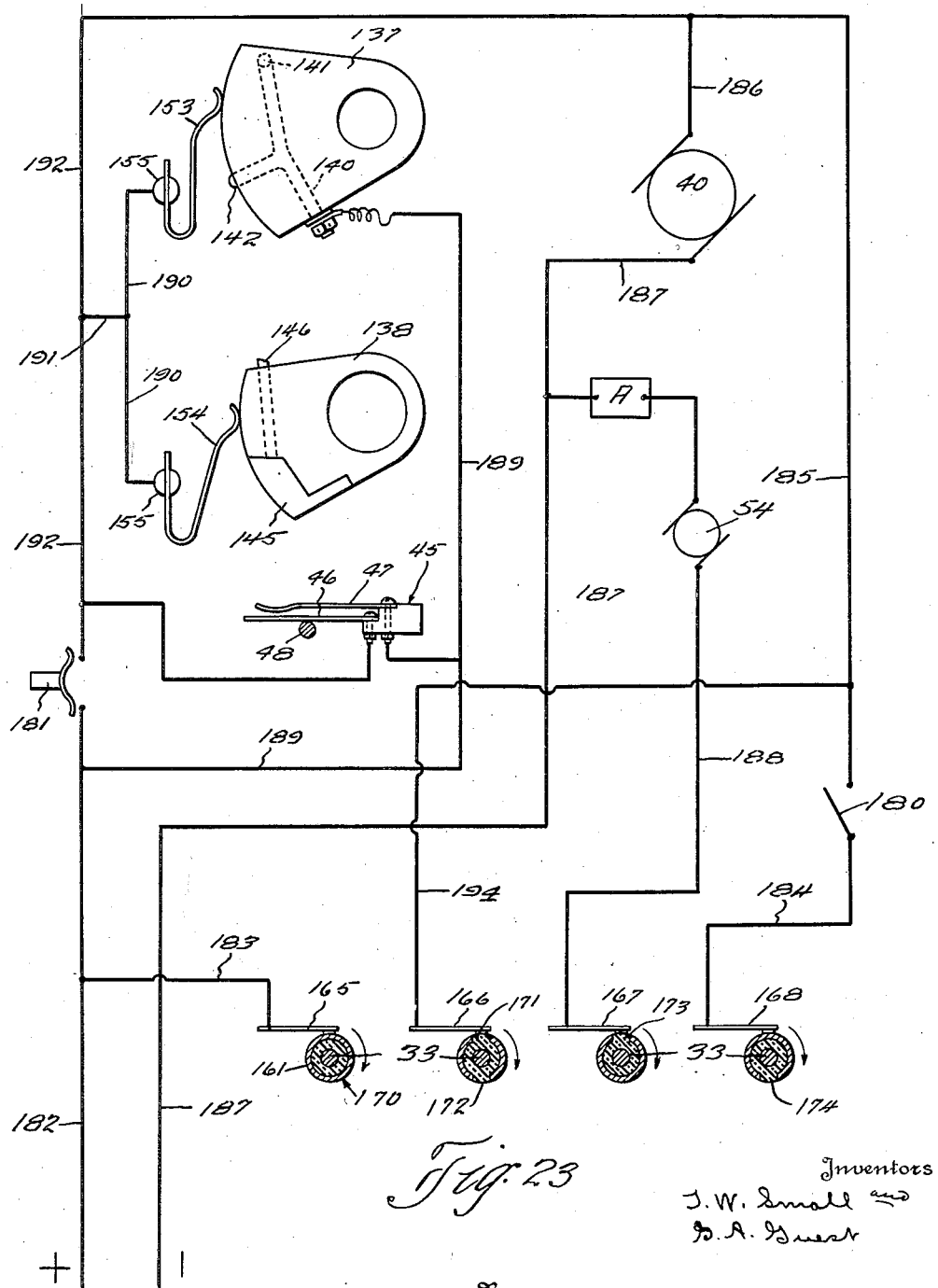

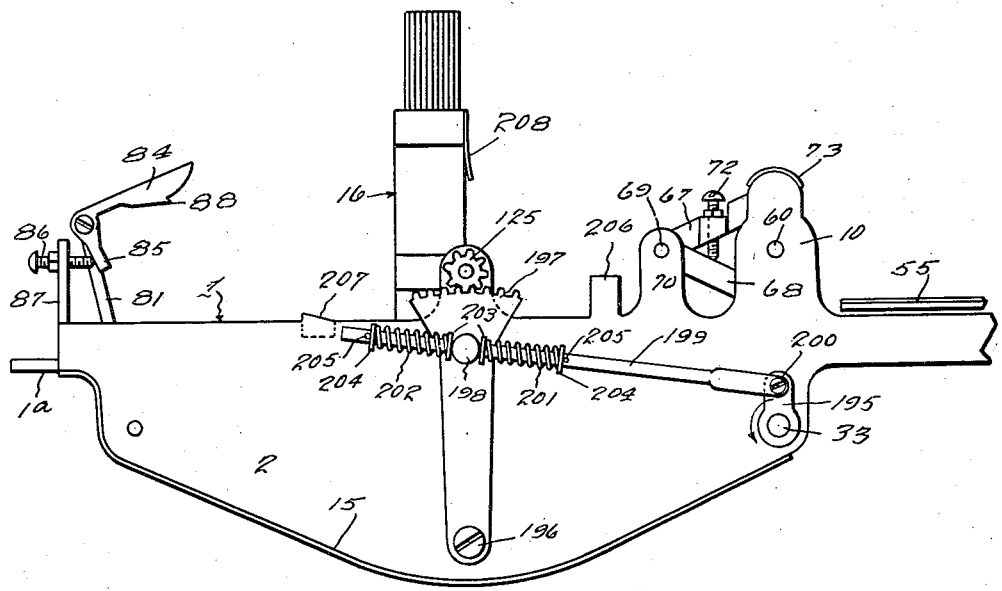

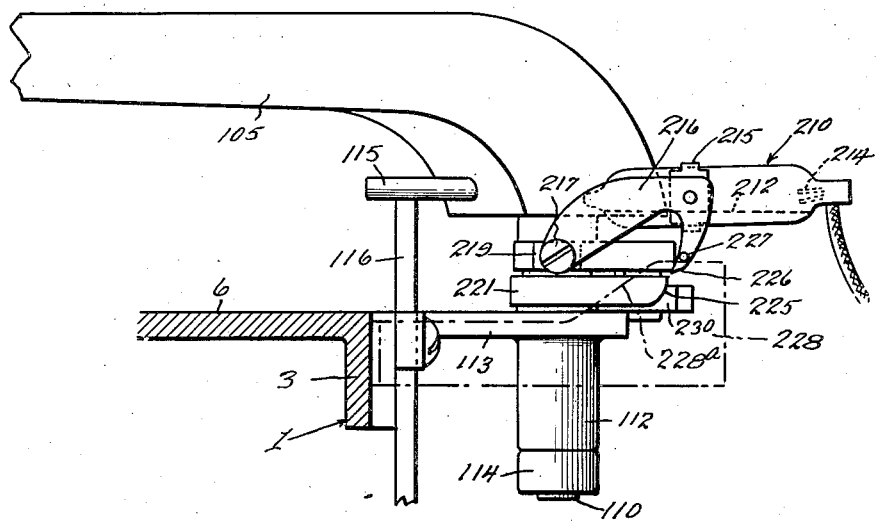

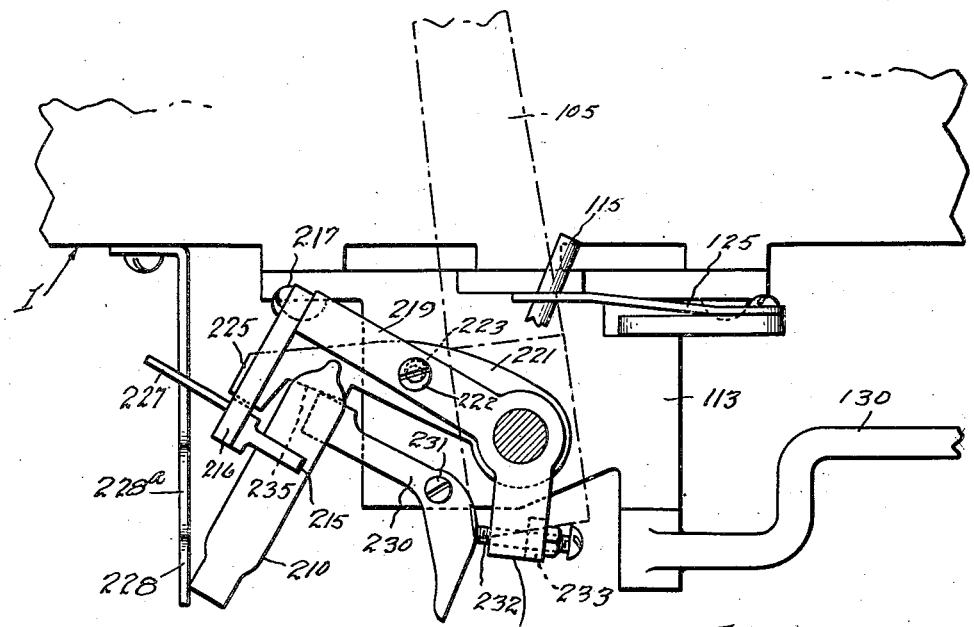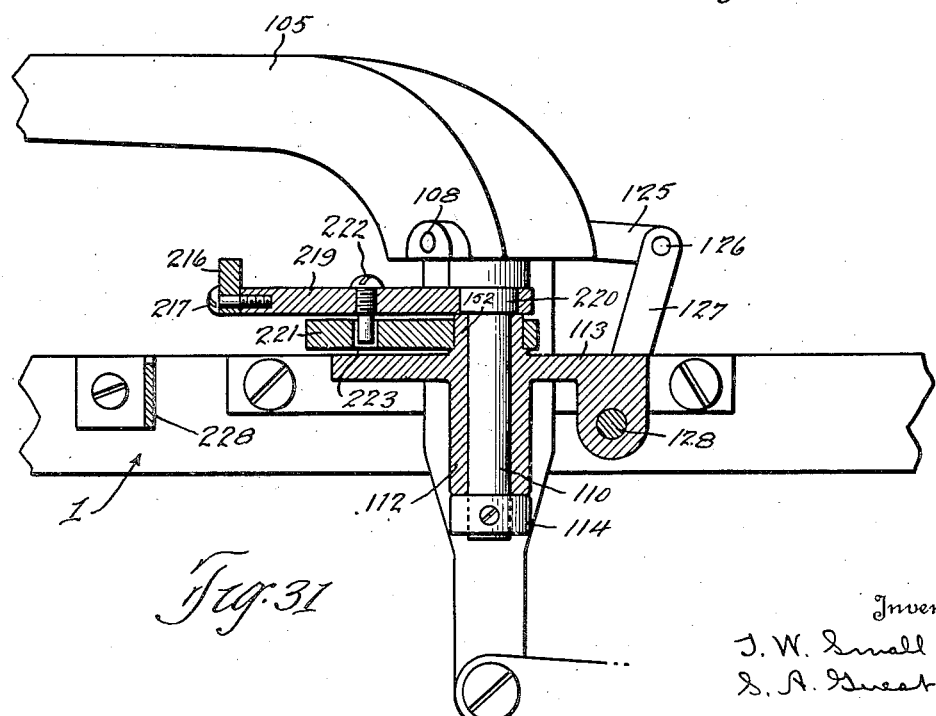

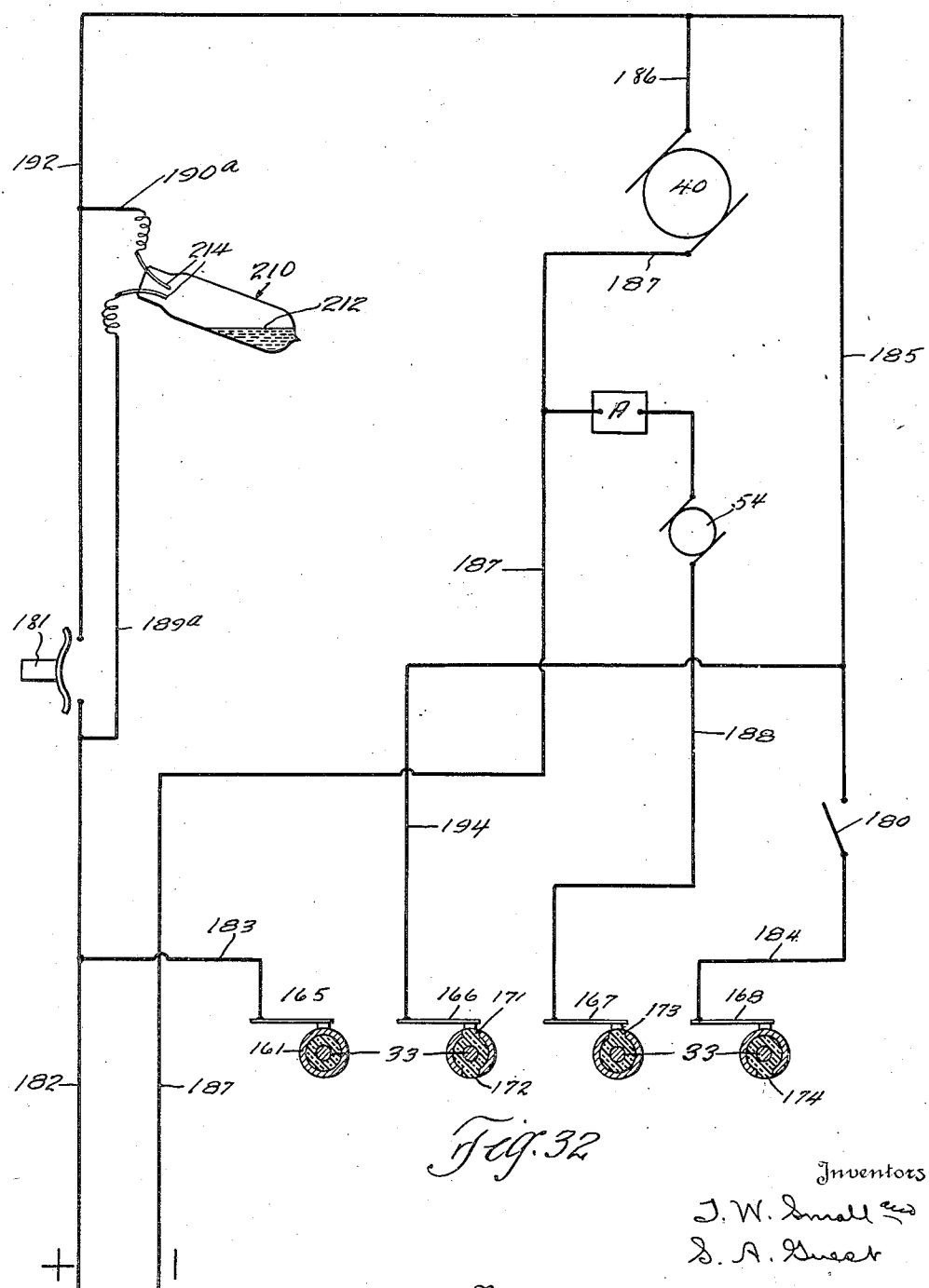

Patented July 17, 1934

1,966,692

UNITED STATES PATENT OFFICE 1,966,692

AUTOMATIC PHONOGRAPH

Thomas W. Small and Stanton A. Guest, Huntington, Ind.; Evea B. Guest administratrix of said Stanton A. Guest, deceased Application September 25, 1931, Serial No. 565,014

22 Claims. (Cl. 274—10)

Our invention relates to automatic phonographs, and it has for its primary purpose to simplify yet decidedly improve sound reproducing machines of this class and provide an instrument that is thoroughly reliable, practically infallible, durable, and is not likely to get out of order.

Further objects are the production of a machine of the foregoing character wherein the records are normally supported on edge to avoid warping, and in such manner that they may be readily removed from the machine—at any time excepting when the records are being transferred from the magazine to the turntable and vice versa—so that they may be rearranged or substitutions made; the production of record changing mechanism wherein the record holder or magazine oscillates through substantially 180° between the removal of a record from and the return of a record to the same thereby to reverse the records between playings so that in subsequent renditions the opposite sides of the records are played; the production of an automatic phonograph that is especially quiet of operation; the production of record changing mechanism that is relatively small and compact so that it may be housed, with the usual power operated driving mechanism, amplifier and loud speaker, in a neat and attractive cabinet whose size is not objectionable in the average home.

The invention further contemplates simple and reliable means for controlling the record changing mechanism that is operable by either the spiral-lead-in type or the eccentric type runover grooves of well known makes of records.

Figure 1:
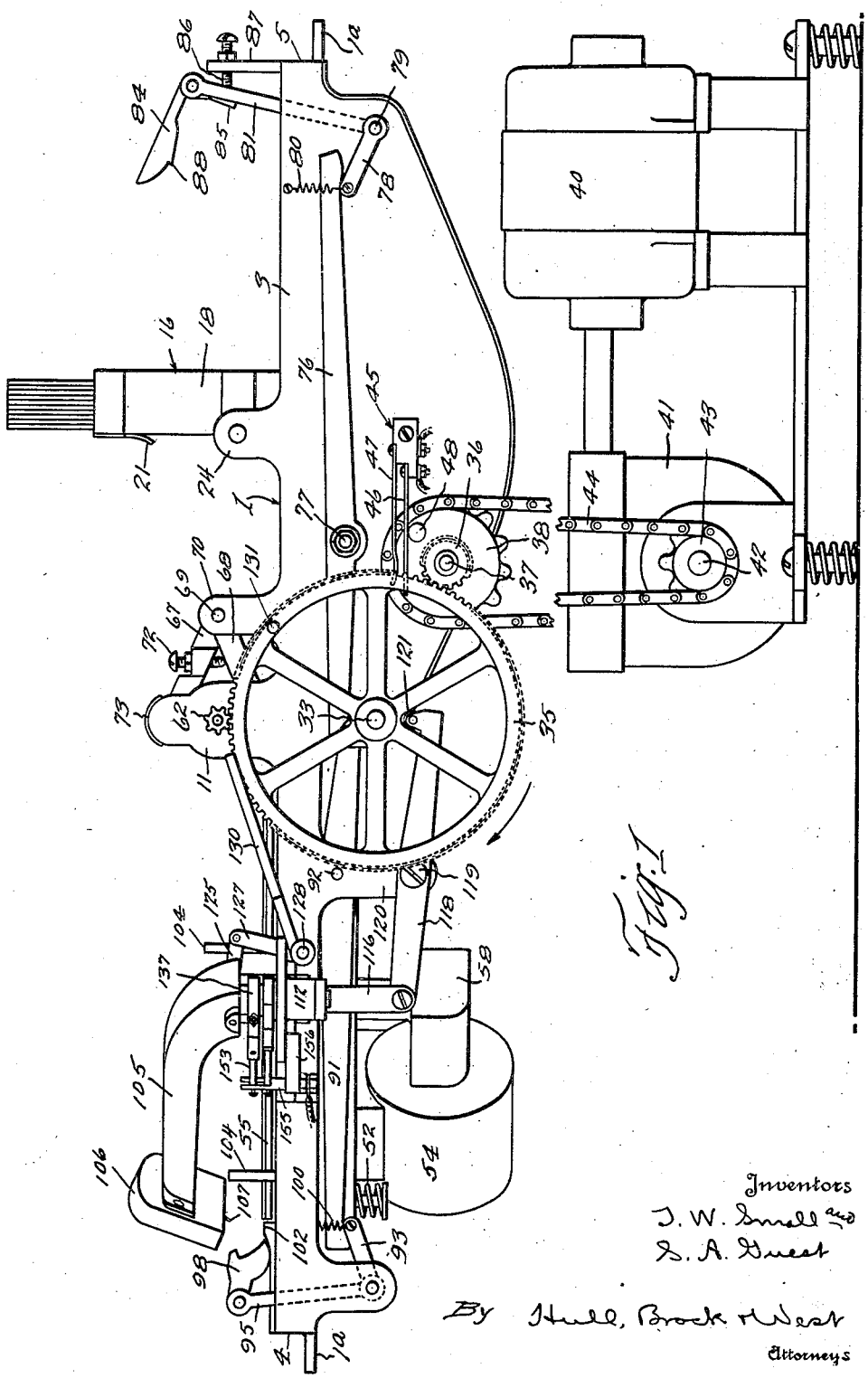
Figure 16:
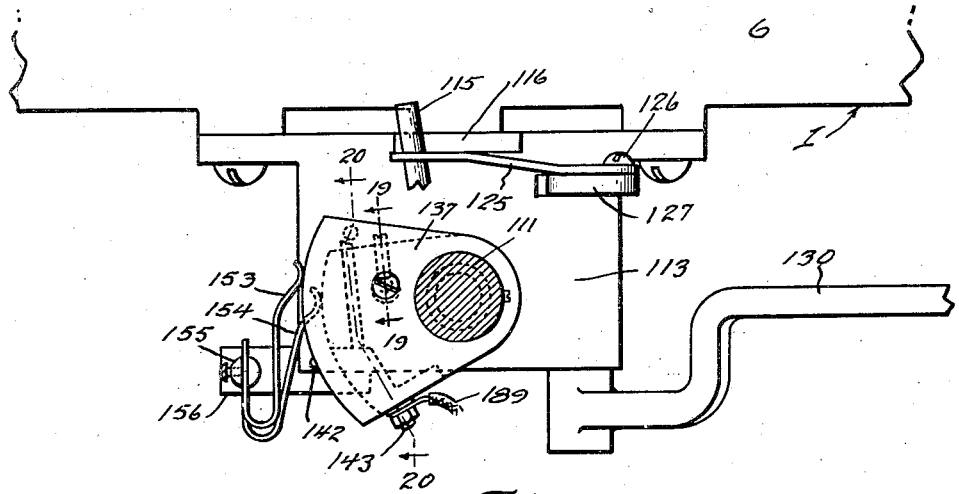
Figure 17:
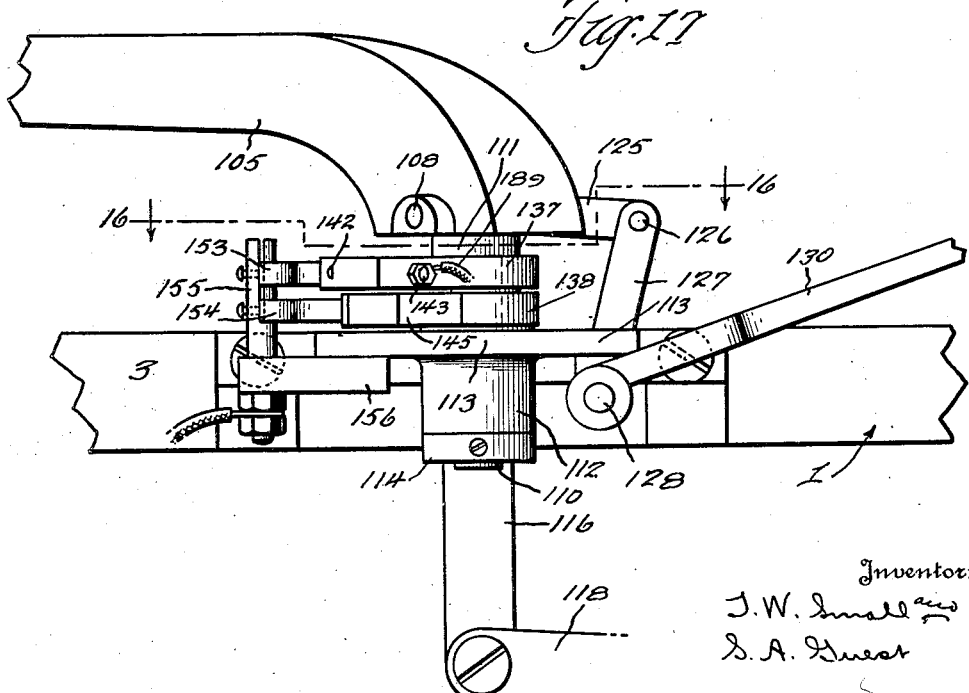
Figure 26:
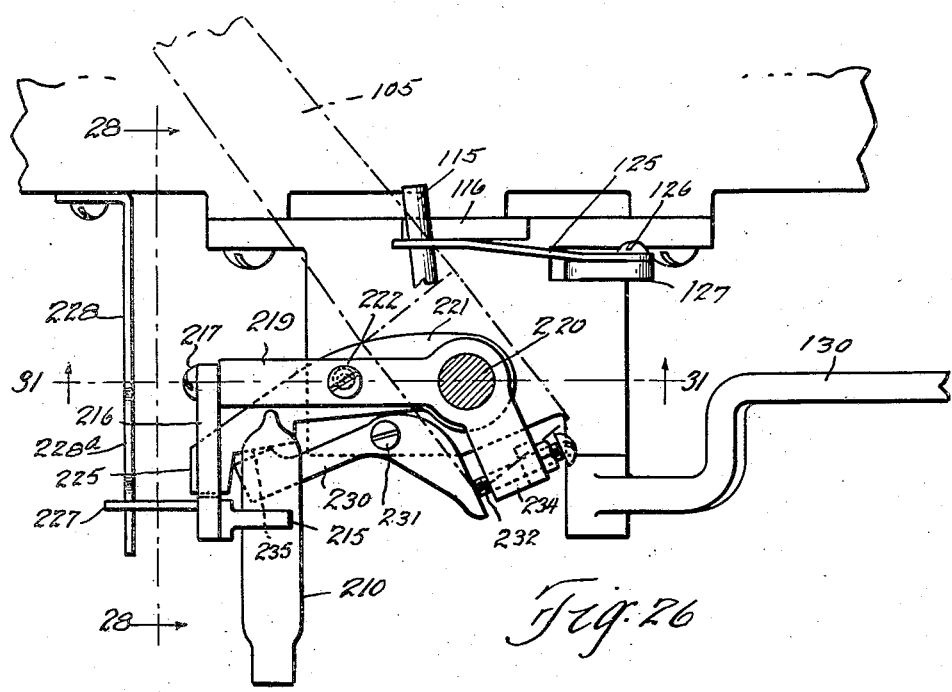
Figure 27:
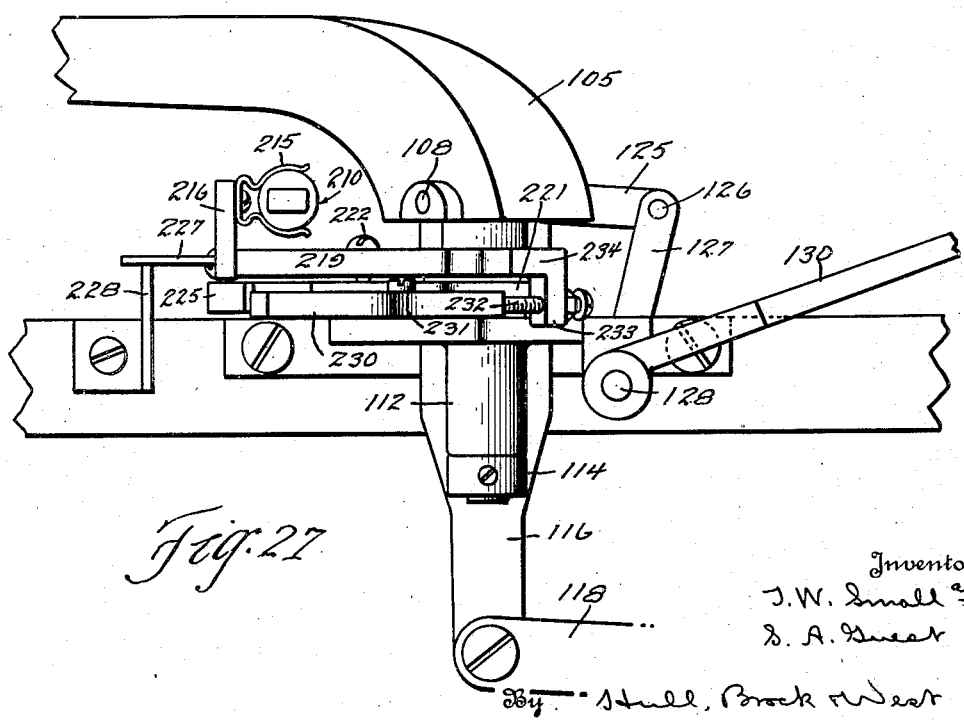

Further objects and advantages will become apparent as we proceed to describe our invention in detail by reference to the accompanying drawings wherein Fig. 1 is an elevational view of what may be considered the rear of the machine, it being the side opposite that from which the sound issues, the loud speaker, amplifier and cabinet being omitted from the drawings inasmuch as they constitute no part of the invention; Fig. 2 is a plan view of the machine; Fig. 3 is a vertical longitudinal section through the machine, the view being taken from the same side as Fig. 1; Fig. 4 is a detail in the nature of a plan view of the control switch that is actuated by the main driving shaft; Figs. 5, 6, 7 and 8 are sectional views on the respective lines 5—5, 6—6, 7—7 and 8—8 of Fig. 4; Figs. 9 and 10 are sectional views similar to Fig. 3 with the turntable operating motor and mechanism omitted and showing, respectively, the positions of the magazine when a record is being transferred therefrom to the turntable, and from the turntable to the magazine; Fig. 11 is a plan view of the magazine end of the machine with the magazine substantially in the position shown in Fig. 10; Fig. 12 is a front elevation of the magazine end of the machine showing the mechanism by which the magazine is oscillated; Figs. 13, 14 and 15 are diagrammatic detail views, respectively, of the cam, and the parts operated thereby, for initiating the transfer of a record from the magazine to the turntable; of the cam, and the parts actuated thereby for initiating the return of a record from the turntable to the magazine, and the cam, and the parts operated thereby for raising and lowering the tone arm; Fig. 16 is a sectional detail, in plan, showing the switch that is operated by the tone arm and controls the transfer mechanism, the view including parts associated with the tone arm and switch, the plane of section being indicated substantially by the line 16—16 of Fig. 17; Fig. 17 is a fragmentary rear elevation of the tone arm and switch and the parts by which the tone arm is raised and lowered and returned to starting position; Fig. 18 is a fragmentary section from front to rear through the parts shown in Fig. 17; Figs. 19 and 20 are sectional details on the respective lines 19—19 and 20—20 of Fig. 16; Fig. 21 is a plan view of the upper unit and Fig. 22 a similar view of the lower unit of the switch that is operated by the tone arm for controlling the record changing mechanism; Fig. 23 is a wiring diagram of the electrical circuits of the machine, including the type of tone arm switch shown in detail in Figs. 16 to 22; Figs. 24 and 25 are a fragmentary side elevation and a partial plan view of the machine showing a modified form of the mechanism for oscillating the record holder or magazine; Fig. 26 is a sectional plan view of a modification of the tone arm switch, the section being through the tone arm spindle while the tone arm is indicated in broken lines; Fig. 27 is a rear elevation of the modified form of tone arm switch and the associated parts adjacent thereto; Fig. 28 is a section on the line 28—28 of Fig. 26; Fig. 29 is a view similar to Fig. 26 showing the switch parts in a position to which they have been moved by an inward swinging of the tone arm; Fig. 30 shows the parts of the tone arm switch in the position they assume when the tone arm is moved to the limit of its inward travel by a runover groove of the spiral-lead-in type; Fig. 31 is a section on the line 31—31 of Fig. 26; and Fig. 32 is a wiring diagram of the circuits of the machine as modified to include the form of tone arm switch illustrated in Figs. 26–31.

The frame of the machine, which is designated generally by the reference numeral 1, consists of front and rear side members 2 and 3 and end members 4 and 5. The opposite end portions of the machine may be conveniently referred to as the "turntable end" and the "magazine end", and the former includes a stationary table 6 which closes that end of the frame 1, while toward the center of the machine it is inclined downwardly, as shown at 7. A ledge 8 extends across the end of the frame opposite the table 6 in the plane thereof.

Located at about the longitudinal center of the machine are brackets 10 and 11 that rise from the front and rear sides of the frame, respectively, and a bracket 13 that depends a substantial distance below the front side of the frame 2 in vertical alignment with the bracket 10. The side members of the frame 1 throughout the magazine end of the machine are made of considerable depth and are curved downwardly and to their lower edges is connected a pan 15.

The record magazine, designated generally by the reference numeral 16, is a frame-like structure having curved sides 17 and 18 (Fig. 11) that are connected on one side of the magazine by a cross member 19, the opposite side of the magazine being practically open throughout its area excepting for the overhanging lugs 20 adjacent the bottom of the magazine and the more extensive lugs 21 adjacent the top of the magazine. Trunnions 22 and 23 extend from the front and rear side members 17 and 18, respectively, and they are journaled within standards 24 that rise from the corresponding side members of the machine frame 1. The trunnion 22 extends beyond the standard in which it is journaled and has fastened to its protruding end a pinion 25 (Figs. 11 and 12). This pinion 25 meshes with a rack 26 that is reciprocably mounted on a rail or guide 27 that is fastened to the adjacent side of the machine frame, and it is connected by a link 28 to a yoke 29 pivoted at 30 to the previously mentioned depending bracket 13. This yoke is adapted to be oscillated by a cam 31 that carries a roller 32 and is fastened to the main shaft 33 of the machine that is journaled within bearings formed in the side members 2 and 3 of the frame 1. Secured to the rear extremity of the shaft 33, a substantial distance beyond the side member 3 of the machine frame, is a relatively large gear 35 that is driven by a pinion 36 on a stub shaft 37 that extends from the adjacent side member of the machine frame, and fastened to the pinion so as to rotate therewith on the shaft 37 is a sprocket wheel 38. Suitably supported within the cabinet (not shown) and at a proper distance below the frame 1 is a driving mechanism including an electric motor 40 that drives, through suitable gearing enclosed by a housing 41, a shaft 42 that has secured to it a sprocket pinion 43. A chain 44 is engaged about the sprocket pinion 43 and the sprocket wheel 38 referred to above. The motor 40 may be referred to as the record changing motor inasmuch as it drives the record changing mechanism. An electric switch 45, comprising electric contact springs 46 and 47, is fastened to the side of the machine frame adjacent the sprocket 36 and in such relation thereto that a pin 48, preferably of insulating material, that is carried by the sprocket 38, engages the contact spring 46 and lifts it into engagement with the contact spring 47 each time the sprocket rotates. The purpose of this switch will be presently explained.

Resiliently suspended from and below a substructure 50 of the table 6, through pins 51 and springs 52, is a base 53 (Fig. 3) from which is supported an electric motor 54 termed, by reason of its function, the "turntable motor", the same driving, through suitable transmission mechanism, the turntable 55 that is located immediately above the stationary table 6. The turntable has a boss 57 that is connected to the above mentioned transmission mechanism housed within a casing 58 by a pin 59 that projects above the turntable where its upper end is tapered to facilitate the engagement of the central opening of a disk record thereover, this pin serving to centralize and maintain central the record on the turntable, in a manner well known.

Journaled within bearings in the previously mentioned brackets 10 and 11 are the end portions of a shaft 60 to the central part of which is secured a feed roller 61 of rubber or other suitable material. The rear end of the shaft 60 projects beyond the standard 11 and has fastened to it a pinion 62 that meshes with the gear 35. Rollers 63 and 64, similar in character to but smaller in diameter than the roller 61 engage the upper and lower sides of the larger roller, the same being mounted upon the respective shafts 65 and 66 that are supported at their opposite ends by pairs of opposed links 67 and 68 the links of each pair overlapping at their ends opposite the rollers and being journaled upon a member or screw 69 that is supported by a standard 70 that rises from the corresponding side member of the machine frame. The links 67 and 68 of each pair are drawn toward each other by a spring 71 whose ends are fastened to said links, and the links are restricted in their approach toward each other by an adjusting screw 72 that is threaded through a boss on the link 67 and engages the link 68. A guard 73 is supported by and between the brackets 10 and 11 above the roller 63.

Immediately inside the gear 35, a cam 75 (Figs. 2 and 13) is fastened to the shaft 33 and cooperates with the adjacent end of a lever 76 that is pivoted at 77 to the side of the machine frame (Fig. 1). The opposite end of the lever 76 overlies an arm 78 that is fastened to the rear end of a shaft 79 journaled in the opposite side members of the frame 1. A spring 80, that has one of its ends connected to the free end of said arm and its opposite end anchored to the machine frame, tends to elevate the free end of the arm and swing outwardly an arm 81 that is fastened to the middle portion of the shaft 79 and is accommodated by a notch 82 in the previously mentioned ledge 8. Pivoted at 83 to the upper end of the arm 81 is a gravity dog 84 having a right angle extension 85 that is adapted to engage an adjusting screw 86 (Figs. 1 and 3) that is threaded through a part 87 that rises from the end member 5 of the frame 1. The dog 84 has a record engaging nose 88 outwardly beyond which the lower edge of the dog is curved upwardly and is smooth so that it may ride upon a record without danger of injury thereto, in a manner that will presently be explained.

Inside the rear member 3 of the frame 1 a cam 90 is fastened to the shaft 33 (Figs. 2 and 14) and the same is overridden by the adjacent end of a lever 91 that is pivoted at 92 to the inner side of the frame member 3, as shown in dotted lines in Fig. 2. The opposite end of the lever 91 bears upon an arm 93 that is fastened to a shaft 94 supported by and between the side members of the frame, and at about its longitudinal center said shaft has fastened to it an arm 95 that projects upwardly through a slot 96 in the table 6 and has pivoted to its upper end, at 97, a record elevator 98 having a record engaging abutment 99. A spring 100 (Fig. 1) is connected to and lifts the free end of the arm 93, tending to maintain the parts above described in the position illustrated in all views wherein they appear excepting Fig. 10. The lifter 98 rides upon a slightly elevated track 101 of the table 6 and is adapted to ascend a stationary cam 102 at the inner end of said track and close enough to the edge of the turntable 55 to be beneath the overhanging portion of a record that lies thereon. Opposite the track 100, the table 6 is provided with a skid 103 that is inclined upwardly toward the bight of the rollers 61 and 64. Posts 104 rise from the stationary table 6 about the side of the turntable opposite the feed roller 61 and, as will more fully appear later on, these posts prevent records from being accidentally shifted too far out of register with the turntable to engage over the centering pin 59. As a matter of fact, the posts are seldom called upon to perform this function as the records almost invariably drop onto the turntable with their central openings on the centering pin 59.

The tone arm 105, which carries a so-called pickup 106 at its forward end that involves a stylus or needle 107, is pivoted at its rear end on a cross pin 108 that extends through the upper, enlarged end of the tone arm spindle 110. Between the body portion of said spindle and its enlarged upper end is a part 111 of a diameter intermediate those of the spindle proper and said enlarged upper end. It is evident from the nature of the connection between the tone arm and its spindle that the two rotate together on the axis of the spindle, and that the free end of the tone arm is adapted to be raised and lowered. The tone arm spindle is journaled within a relatively long bearing 112 of a bracket 113 that is secured to and extends rearwardly from the side member 3 of the machine frame. A collar 114 is fastened to the lower end of the spindle 110 to prevent any tendency of its lifting within the bearing 112.

As best shown in Fig. 18, a pin 115 extends generally forwardly from the underneath side of the pivoted end of the tone arm over a tone arm elevator 116 that is in the nature of a slide guided within a slot formed between the bracket 113 and the machine frame. The lower end of this elevator 116 is pivoted to one end of a lever 118 that is fulcrumed on a pivot member 119, carried by and extending rearwardly from a depending portion 120 of the machine frame. The opposite end of the lever 118 carries a roller 121 that engages a cam 122 on the main shaft 33, said cam having a depression 123. This tone arm elevating mechanism is shown in detail in Fig. 15, and it is clear that, when the cam 122 is reversed with respect to the position shown in said view, the roller 121 will be permitted to rise thereby to allow the lever 118 to rock in a direction to lower the elevator 116 and, through the pin 115, the tone arm, so as to engage the stylus or needle 107 with the groove of a record on the turntable 55 when the tone arm is in the correct position thereover.

The tone arm is swung on the axis of its spindle 110 by parts that will now be described. A link 125 (Figs. 1, 16 and 17) has one of its ends journaled on the pin 115, while its opposite end is pivoted at 126 to the upper end of an arm 127 that is secured to and rises from the forward end of a shaft 128 that is journaled in bearings supported by the bracket 113. To the rearward extremity of the shaft 128 is fastened an arm 130 that has its free end disposed in a plane adjacent to and parallel with the gear 35 so that said arm is in the path of a pin 131 that is carried by said gear. It will be understood that when the tone arm 105 is lowered so as to engage the stylus 107 with the groove of a record on the turntable, the free end of the tone arm will be swung inwardly toward the center of the record by the spiral sound groove of the record. From the construction above described, it will be evident that when the tone arm is lifted by the elevator 116, the stylus will be free from the record and it is at this point in the operation of the machine, as will be more fully explained hereinafter, that the pin 131 on the gear 35 engaged and lifts the arm 130, thereby to rock the shaft 128 and, through the arm 127, move the link 125 in a direction to swing the free end of the tone arm toward the periphery of the turntable.

The operation of the record changing mechanism is adapted to be controlled by the so-called "runover" grooves of disk records of the two types having, respectively, the spiral-lead-in runover groove and the eccentric runover groove. The mechanism is electrically actuated and the circuits for supplying current thereto, as will be later explained in connection with the wiring diagram of Fig. 23, involves a switch associated with and operated by the tone arm. This switch comprises two units designated, respectively, 137 and 138 and shown in detail especially in Figs. 21 and 22. The unit 137 consists of a segmental block of fiber or other suitable insulating material having a bore within which is received the part 111 of the tone arm spindle 110. The unit is secured against turning upon said part by a set screw 139. Embedded within the unit or block of insulating material is a conductor 140 having a contact portion 141 that projects downwardly through the under surface of the unit into the plane of the unit 138, as best shown in Fig. 20. A lateral branch of the conductor 140 has its terminal exposed through the arcuate face of the unit to form a contact member 142. A binding post 143 is formed by the extremity of said conductor opposite the contact portion 141, as clearly shown in Fig. 21. The unit 138 has set within one of its corners a contact block 145 from which an embedded pin 146 projects and the end of which is exposed through one side of the block or unit 138 in a position to be engaged, under certain conditions, by the contact portion 141 carried by the unit 137. All of this is clearly illustrated in Figs. 20 and 22. A pin 148 depends from the under side of the unit 137 into an enlarged aperture 149 of the unit 138 and is adapted to engage an adjusting screw 150 that is threaded through the adjacent portion of the unit 138 and has its inner end projecting into said aperture. The unit 138 has a relatively large opening 151 that is frictionally engaged with the reduced upper end 152 of the boss or bearing 112. As the free end of the tone arm moves toward the center of a record the pin 148 engages the screw 150 and causes the unit 138 to travel with the unit 137. The screw 150 is so adjusted that when the pin 148 is in contact therewith, the contact portion 141 of the conductor 140, carried by the unit 137, is spaced from the end of the contact 150 pin 146. Consequently as long as the unit 138 is being propelled by the unit 137 through the intervention of the pin 148 and the screw 150, the contact portion 141 of the latter unit is out of contact with the pin 146 of the unit 138. Spring contact fingers 153 and 154 engage the arcuate faces of the units 137 and 138, respectively, the finger 153, under certain circumstances, engaging the contact member 142, while the finger 158 is adapted to ride over the inset contact block 145. The two contact fingers 153 and 154 are supported by a metallic post 155 that rises from a support 156 of insulating material that is carried by the bracket 113.

Included in the electric circuits that control the operation of the record changing mechanism is another switch associated with the main shaft 33. This switch is shown in Fig. 3 and is detailed in Figs. 4 to 8. It consists of a cylindrical body 160 of insulating material that is secured to the shaft 33 and is surrounded by a metallic sleeve 161 having openings through which extensions of the body 160 project to a plane flush with the surface of the sleeve. The exposed portions of the body of insulating material may be termed "dead spots". Carried by and projecting forwardly from a base 163 of insulating material that is shown as supported by hangers 164 from the table 6, are contact fingers 165, 166, 167 and 168, and the free ends of these fingers bear upon the switch drum made up of the above mentioned parts 160 and 161, and designated generally by the reference numeral 170. The finger 165 is constantly in contact with the sleeve because of the absence of any dead spot in the zone thereof. In the path or zone of the finger 166 are two diametrically opposed dead spots 171 and 172, and in the path or zone of the contact finger 167 is one dead spot 173 that is in longitudinal alignment with the dead spot 171, while in the zone of the finger 168 is a dead spot 174 that is in longitudinal alignment with the dead spot 172. The purpose of this switch will later be explained.

Also secured to the shaft 33 at approximately the transverse center of the machine is a cam 175 that, through a certain angle of its movement, projects through a slot 176 in the downwardly inclined portion 7 of the table 6 so that it may engage the shorter end of a lever 177 that is fulcrumed on a pivot member 178 that extends from the downwardly turned end of said inclined portion 7. The longer end of the lever is sustained by a stop 179 when the lever is in normal position. This feature is especially well illustrated in Figs. 9 and 10, and its purpose will presently appear.

The complete structure or mechanism which we have hereinbefore referred to as the machine, is adapted to be supported in a cabinet (not shown) by lugs 1ª that project from the end members of the frame 1; and included in the circuits, besides the switches and motors already mentioned, are a main switch, designated 180 in Fig. 23, and a self opening emergency switch, so to speak, designated 181.

The operation of the machine will be explained while describing the wiring diagram of Fig. 23; and before proceeding with the description of the operation, it may be stated that the parts are illustrated in all views, excepting in Figs. 9, 10 and 11, in the positions they occupy when the main switch 180 is opened and the machine is stopped. It may also be pointed out here that the machine does not stop when the switch 180 is opened unless or until the cycle of operation is complete.

Assuming, therefore, that the parts are in the positions illustrated in the majority of the views, it may be explained that when the main switch 180 is closed a circuit will be established from the positive side of the line through conductors 182, 183, contact finger 165, metallic sleeve 161 of the switch drum 170, finger 168 (it being noted that the contact fingers 166 and 167 rest upon the dead spots 171 and 173, respectively), a conductor 184, main switch 180, conductors 185 and 186 to the motor 40, and thence through a conductor 187 to the negative side of the line. This energizes the driving motor 140 which, through the gearing housed within the casing 141, rotates the shaft 42 that carries the sprocket pinion 143, and, through the chain 44 engaged about this pinion, the sprocket wheel 38 and pinion 36, connected thereto, are driven. This pinion 36, meshing with the relatively large gear 35, rotates said gear in the direction indicated by the arrow in Fig. 1. The main shaft 33, to which this gear is fastened, rotates, and instantly the cam 31 on the opposite end of the shaft starts to swing the yoke 29 and, through the link 28, move the rack 26 in a direction to rotate the pinion 125, and with it the magazine 16 to the position shown in Fig. 9. As the magazine assumes this position, the cam 75 (Fig. 13) engages the adjacent end of the lever 76 and swings downwardly the opposite end thereof so as to depress the arm 78 against the tension of the spring 80 and rock the shaft 79 to swing the arm 81, and the gravity dog 84, forwardly. As the extension 85 of said dog leaves the screw 86 the dog rocks downwardly and its curved forward end is brought to bear upon the top record in the magazine and as the dog is advanced, the nose 88 thereof engages the edge of said record and pushes the record forwardly into the bight of the rollers 61 and 63. The roller 61, which is the feed roller, is being driven in the direction indicated by the arrow in Fig. 3 by reason of the fact that the shaft to which said roller is secured carries the pinion 62 at its rear end that is in constant mesh with the gear 35. The record is fed by means of the roller 61, in frictional contact with which it is held by the roller 63, toward the turntable 55 and is deposited thereon, the posts 104 serving as guards to prevent the record from descending too much out of register with the turntable to permit of its center hole engaging over the centering pin 59 of the turntable. As a matter of fact, the records seldom touch the posts 104, as hereinbefore stated. The operation of the mechanism continues until the dead spot 174 comes beneath the free end of the contact finger 68 whereupon the circuit to the motor 40 is broken. Simultaneously therewith, the depression 123 of the cam 122 (Fig. 15) rides opposite the roller 121 and receives the same thereby to permit the lever 118 to rock and thereby lower the tone arm elevator 116 and with it the free end of the tone arm, causing the stylus 107 to be engaged with the sound groove of the record. In the meantime, the dead spot 173 withdraws from beneath the contact finger 167 causing the finger to engage the metallic sleeve 161 whereupon a circuit is established from the positive side of the line through conductors 182 and 183, finger 165, sleeve 161 of the switch drum 170, finger 167, conductor 188 that includes the turntable motor 54 and the amplifier and loud speaker unit which is designated generally by the letter A in Fig. 23, and conductor 187 to the negative side of the line. Thus it will be seen that the driving motor 40 is now de-energized so that the record shifting mechanism is at a standstill while current is flowing through the turntable motor 54 and the amplifier and loud speaker unit A so that the record is being played. The playing continues until the stylus reaches the runover groove of the record and, if the same is of the well known spiral-lead-in type, the unit 137 of the tone arm switch will be turned to a position in which the contact member 142 thereof engages the contact finger 153. Current will now flow from the positive side of the line through conductors 182, 189 and 140 (the latter constituting a part of the unit 137), contact member 142, the contact finger 153, posts 155, conductors 190, 191 and 192 to the previously mentioned conductor 186 and thence through the motor 40 and conductor 187 to the negative side of the line. This will momentarily energize the motor and, in so doing, will cause the main shaft 33 and the switch drum 70 that is carried thereby to be turned, thereby to withdraw the dead spot 174 from beneath the contact finger 168 so that current may now flow as in the first described instance through the motor 40.

In case the record is one of the type having an eccentric runover groove, the unit 137 will be oscillated by reason of the corresponding motion that is imparted to the tone arm by said eccentric groove, and in the oscillation of the unit 137 the contact portion 141 of the conductor 140 will intermittently engage the conducting pin 146 of the unit 138 and the current will be carried from the conductor 189 through conductor 140 and pin 146 to the contact block 145 and thence through the contact finger 154, post 155, and so on through the motor 40 to the negative side of the line, as before described, it being understood that, by the time the stylus reaches the runover groove, the contact block 145 is beneath the finger 154.

In the event that the duration of current flow through the conducting parts of the tone arm switch comprising the units 137 or 138 is insufficient to cause the motor 40 to accomplish the initiation of the concluding phase of the cycle of operation of the machine, longer contacts will be made at very frequent intervals during the incipient action of the motor through the switch comprising the contact springs 46 and 47 that are forced together by the pin 48 upon each revolution of the sprocket gear 38. This switch is in a shunt circuit between conductors 189 and 192 and prolongs the flow from the one to the other that was initiated through the tone arm switch.

As the motor 40 now continues in operation, the cam 122 will be rotated to depress the adjacent end of the lever 118 and, by the ascent of its opposite end, lift the tone arm elevator 116 thereby to withdraw the stylus from the groove of the record, and as the gear 35 continues to rotate the pin 131 thereof will engage the arm 130 and, through the shaft 128, arm 127, and link 125, (Figs. 16 and 17) swing the free end of the tone arm to a position adjacent the peripheral portion of the record. By now the cam 90 (Fig. 14) lifts the adjacent end of the lever 91, depressing its opposite end so as to swing the arm 93 downwardly against the tension of spring 100 and rock the shaft 94 so as to move, through the intervention of the arm 95, the record lifter 98 inwardly along the track 101 and up the incline of the stationary cam 102 so as to pick up the record from the turntable and disengage its center hole from the centering pin 59. The record engaging abutment 99 of the lifter will strike the edge of the record and shove the record into engagement with the skid 103 which will serve to direct the advancing edge of the record into the bight of the rollers 61 and 64. As the machine is at present operating, the feed roller 61 will be driven as in the first described phase of the operation and the record will be fed between said roller and the roller 64 onto the magazine.

Here it may be explained that during the final portion of the first described phase of the operation of the machine, the cam 31 on the forward end of the shaft 33 (Fig. 12), directly reversed its position so as to return the yoke 29 and consequently the rack 26 to their original positions which resulted in swinging the magazine to the vertical position shown in the majority of the views and in which position the records rest on edge, thereby to prevent warping. Now, during the phase of the operation at present under consideration, the cam 31 swings upwardly and moves the rack 26 to the right, as the parts are viewed in Fig. 12, thereby to dispose the magazine in the position illustrated in Fig. 10, the magazine remaining in this position, while the concentric portion of the cam 31 rides up the right hand side of the yoke 29. During this dwell in the oscillation of the magazine, the record is transferred from the turntable through the feed rollers to a position in which its advancing edge is projected beneath the lugs 21 of the magazine frame (see Fig. 11) but as the record drops from the feed rollers it will rest on top of the lugs 20. At this point, the cam 175 will swing over and engage the short end of the lever 177, depressing such end and lifting the opposite end so that it will engage the newly delivered record as well as the other records in the magazine and shove all of them toward the right, as the parts are viewed in Fig. 10, sufficiently to permit the newly delivered record to drop past the lugs 20. When the cam 175 passes beyond the short end of the lever 177, said lever will fall back by gravity against the stop 178, and the cam 31 returning at the same time to its normal position, will move the magazine to its normal vertical position, as illustrated in Fig. 12, when all the records will drop to rest on the bottom of the magazine.

It may be explained that at any time during the operation of the machine, the main switch 180 may be opened and in the event this is done, current will continue to flow from the positive side of the line through conductors 182 and 183, contact finger 165, the metallic sleeve 161 of the switch drum 170 and to the contact finger 166; it being obvious that during either phase of the operation, before or after the record is played, the metallic sleeve of the switch drum will be in contact with the finger 166, inasmuch as the dead spots 171 and 172 are out of register therewith. The flow of current continues from finger 166 on through a conductor 194 to the conductors 185 and 186 and thence through the motor 40 and conductor 187 to the negative side of the line.

Attention is also called to the fact that in case the playing of a record has been started and it is then desired to discontinue its playing and immediately proceed to the next, the switch 181 may be closed which serves the same purpose as the tone arm switch comprising the units 137 and 138. Upon the closing of the switch 181 current flows directly through the conductor 182, switch 181 and conductor 192 to conductor 186 that leads to the motor 40, the current passing on therefrom through the conductor 187 to the negative side of the line.

A somewhat simpler mechanism for oscillating the record holder or magazine 16 than that hereinbefore described is shown in Figs. 24 and 25, where a crank 195 is substituted for the cam 31, said crank being fastened to the forward end of the shaft 33. Journaled on a pivotal member 196, that extends from the front member 2 of the machine frame 1 in the vertical plane of the pinion 125, is a gear segment 197 that meshes with said pinion; and extending loosely through a forwardly projecting boss 198 of said segment is a rod 199 that has its end remote from said boss journaled on the pin 200 of the crank 195. Coil springs 201 and 202 surround the rod 199 on opposite sides of the boss 198 and are interposed between washers 203 that contact with said boss and abutments 204 that are carried by the rod in spaced relation to said washers. The abutments 204 may consist of washers held in place by pins 203 that are passed through the rod. On opposite sides of the oscillating axis of the record holder or magazine 16 are stops 206 and 207 that project inwardly from the frame member 2 in the path of a portion designated 208 of the magazine.

It will be remembered that the magazine normally stands in an upright position. When the record changing mechanism is set in operation in the manner hereinbefore described, the shaft 33 starts rotating in the direction indicated by the arrow in Fig. 24, and during the first part of the movement of the crank 195, the segment 197 will be swung in a direction to rotate the magazine 16 through the intervention of the pinion 125 in a direction to engage the part 208 thereof with the stop 206, so that, through the action of the previously described mechanism including the dog 84 and rollers 61 and 63, a record may be removed from the magazine and delivered to the turntable 55. The transfer of the record from the magazine to the turntable occurs while the magazine is held in definite position by the stop 206, and during this time the crank 195 swings through the angle of its movement that imparts the least movement to the rod 199, such movement of the rod being absorbed by the spring 201. As the shaft reaches the bottom of its throw it will return the parts to normal position so that the magazine 16 will be held upright. The mechanism remains in this condition until the record is played when it is again set in motion and the crank 195 swings upwardly on the opposite side of the shaft 33 to complete its cycle. During this movement of the crank, the segment 197 is swung to the right (as the parts are viewed in Fig. 24) and the magazine is oscillated to bring the part 128 into engagement with the stop 207, in which position it is held while the record is being returned to the magazine. As the crank swings through that portion of its present travel which imparts the least movement to the rod 199, such movement is absorbed by the spring 202, but as the crank resumes its upright position the parts connected therewith are returned to their normal positions, as will be readily understood.

The modification of the tone arm switch illustrated in Figs. 26 to 31 is for use under circumstances in which the open contacts of the previously described tone arm switch are undesirable or their use prohibited. In the present case, the switch proper, designated generally by the numeral 210, is of the enclosed type and consists of a capsule of glass or the like containing a quantity of mercury 212. Contact points 214 project into the interior of the capsule and when the latter is tilted in an appropriate direction they are bridged by the mercury 212.

The tilting switch 210 is connected, by a clip 215, to a gravity member or dog 216 that is pivoted at 217 to the outer end of a unit 219 whose inner end surrounds and is suitably fastened to an enlarged portion 220 of the tone arm spindle 110, said spindle being journaled in the boss 112 of the bracket 113, the same as in the previously described construction. Journaled on the reduced upper end 152 of the boss 112, below the unit 219, is a unit 221, there being sufficient friction between the last mentioned unit and the part on which it is mounted to yieldingly maintain it in different positions to which it is moved. The lower end of a screw 222 that is threaded through the unit 219 projects into an aperture 223 of the unit 221, said aperture being of considerably larger diameter than said end of the screw thereby to provide a lost-motion connection between the units. The unit 221 terminates at its outer end in a ledge 225 that is undercut, as best shown in Fig. 28, and the nose 226 of the gravity member or dog 216 is disposed adjacent the rear edge of said ledge. By reason of the relative movement permitted between the units 219 and 221 by the lost-motion connection above referred to, the nose 226 of the dog is adapted to move between a position immediately to the rear of the ledge 225 and a position slightly forwardly thereof, in which latter case the dog is sustained by the ledge. A pin 227 that projects laterally from the dog traverses a stationary cam 228 that is secured to and projects rearwardly from the machine frame 1 adjacent the bracket 113.

A bell crank lever 230 is pivoted at 231 to the bracket 113 to swing in the plane of the unit 221, and what may be considered its rear branch is adapted to be engaged by a screw 232 that is threaded through a depending lug 233 of a rearward extension 234 of the unit 219 while its other branch is in position to engage an abutment portion 235 of the unit 221.

As the tone arm is swung in a direction to dispose its free end adjacent the periphery of a record by the connections involving the pin 115, link 125, etc., the unit 219 is swung in a corresponding direction and as it is so moved the pin 227 that projects laterally from the dog 216 rides up the inclined portion 228ª of the cam 228 and assumes a position on the elevated portion of the cam in which position it sustains the nose 226 of the dog above the plane of the ledge 225 of the unit 221, said unit being also moved in the direction aforesaid by reason of its lost-motion connection with the unit 219 effected through the screw 232. It will be understood, however, that when the parts are moving in the direction now under consideration, that the ledge 225 will be forwardly of the nose of the dog, the lower unit lagging behind the upper one a distance corresponding to the difference in diameter of the lower end of the screw 222 and the aperture 223.

Now, in the playing of a record, as the tone arm starts to swing inwardly it will move the unit 219 forwardly and advance the dog 216 so that the nose 226 thereof will be above the ledge 225, this relative movement between the dog and ledge occurring while the screw 222 is moving to the forward side of the aperture 223. Thereafter the upper and lower units will move in unison until the run-over groove of the record is reached. If such groove be of the eccentric type, the tone arm will be oscillated; and upon the first slight reverse movement of the tone arm, and consequently of the unit 219, the dog 216 will be swung rearwardly to free its nose from the ledge 225 thereby permitting the dog to drop, the pin 227 thereof in the meantime riding to a position above the lower portion of the cam 228. The dropping of the dog 216 results in the rearward tilting of the switch 210 and the flowing of the mercury 212 about the contact points 214.

As will be seen by reference to Fig. 32 the switch 210 occupies the same place in the circuit as the previously described tone arm switch involving the units 137, 138, the current being delivered to the switch through the conductor 182 and 189ª, and returning therefrom through the conductors 190ª, 192, etc., the circuit including, of course, the motor 40. The closing of the circuit at the switch 210 results in the starting of the record changing mechanism and in the present case there is no occasion for a switch corresponding to the one comprising the springs 46 and 47 because the closing of the switch 210 is positive and of a constant rather than an intermittent nature.

In the movements of the tone arm and the switch parts associated therewith incident to the playing of a record, the bell crank lever 230 is swung about on its pivot 231 by the screw 232, the forward branch of the lever keeping in close proximity at all times to the abutment 232. However, as the tone arm is advanced toward the center of the record by the spiral-lead-in type of runover groove, the bell crank lever is given an excessive movement by the screw 232 which causes it to thrust the unit 221 forwardly with respect to the unit 219 and withdraw the ledge 225 from beneath the nose of the dog 216 allowing the dog to drop and the switch 210 to tilt to circuit closing position.

Having thus described our invention, what we claim is:

1. In a phonograph, the combination of sound reproducing means, an invertible record holder, means including feed rollers for transferring records from the holder to the sound reproducing means and for returning them from said means to the holder, and means for reversing the position of the holder between such transfers.

2. In an automatic phonograph, the combination of a horizontally disposed turntable wherewith the sound reproducer is associated, a magazine for disk records supported for oscillation between normal vertical position wherein it sustains the records on edge and a substantially horizontal position, and mechanism for oscillating the magazine and for transferring records therefrom to the turntable and from the turntable to the magazine when the magazine is in substantially horizontal position.

3. In an automatic phonograph, the combination of record rotating means wherewith the sound reproducer is associated, a magazine for records, and record transfer means comprising a single set of rollers which by and between a certain combination of its constituents the records are fed from the magazine to the record rotating means and which by and between another combination of its constituents the records are returned from the record rotating means to the magazine, one of the constituents being common to both combinations.

4. In an automatic phonograph, the combination of record rotating means wherewith the sound reproducer is associated, a magazine for records, and a driven feed roller situated between said means and the magazine, means disposed on opposite sides of the feed roller for holding records in frictional contact therewith, and means for displacing records from the magazine and from the record rotating means and engaging them with the feed rollers.

5. In an automatic phonograph, the combination of record rotating means wherewith the sound reproducer is associated, a feed roller adjacent one side of said means, a record magazine beyond the side of the feed roller opposite the record rotating means and supported for oscillation between a position in which one of its sides is at substantially the elevation of the top portion of the feed roller and a second position wherein its other side is approximately in the plane of the bottom portion of said roller, and mechanism for oscillating the magazine and for displacing records from the magazine and rotating means into contact with the feed roller.

6. In an automatic phonograph, the combination of record rotating means wherewith the sound reproducer is associated, a feed roller adjacent one side of said means, a record magazine beyond the side of the feed roller opposite the record rotating means and supported for oscillation between a position in which one of its sides is at substantially the elevation of the top portion of the feed roller and a second position wherein its other side is approximately in the plane of the bottom portion of said roller, mechanism for oscillating the magazine and for displacing records from the magazine and from the rotating means into contact with the feed roller, and means for maintaining the records so displaced in frictional engagement with the feed roller.

7. In an automatic phonograph, the combination of a horizontal turntable, a driven feed roller adjacent one side thereof, a magazine for disk records located beyond the side of the feed roller opposite the turntable and supported for oscillation between a substantially horizontal position in which one of its sides is at substantially the elevation of the top portion of the feed roller and a second substantially horizontal position wherein its opposite side is approximately in the plane of the bottom portion of the feed roller, mechanism for oscillating the magazine and for projecting the records from the magazine and turntable into contact with the feed roller, and means for maintaining records so projected in frictional engagement with the feed roller.

8. In an automatic phonograph, the combination of a horizontal turntable, a driven feed roller adjacent one side thereof, a magazine for disk records located beyond the side of the feed roller opposite the turntable and supported for oscillation between a substantially horizontal position in which one of its sides is at substantially the elevation of the top portion of the feed roller and a second substantially horizontal position wherein its opposite side is approximately in the plane of the bottom portion of the feed roller, mechanism for oscillating the magazine and for projecting the records from the magazine and turntable into contact with the feed roller, and further means for adjusting records in the magazine that are returned thereto from the turntable.

9. In an automatic phonograph, the combination of a horizontal turntable having a centering pin rising therefrom for engagement within the center holes of disk records, a record magazine spaced laterally from the turntable, a set of feeding rollers situated between the turntable and the magazine for transferring records from one to the other, and a record lifter for disengaging records from the centering pin and presenting them to the feeding rollers.

10. In an automatic phonograph, the combination of a horizontal turntable having a centering pin rising therefrom for engagement within the center holes of disk records, a record magazine spaced laterally from the turntable, a set of feeding rollers situated between the turntable and the magazine for transferring records from one to the other, the feeding rollers being in spaced relation to the magazine, and means for engaging a record upon its leaving the feeding rollers and shoving it into the magazine.

11. In an automatic phonograph, a horizontal turntable, a magazine for disk records supported for oscillation and normally standing in a position to sustain the records on edge, a feed roller situated between the magazine and turntable, means for holding records in frictional contact with the top and bottom of said feed roller, and mechanism for driving the said roller, moving the magazine to a substantially horizontal position, projecting a record from one side thereof to the feed roller so that the latter may transfer it to the turntable and, after the record is played, reversing the magazine, projecting the record from the turntable to the feed roller so that the latter may transfer it to the other side of the magazine, and for finally returning the magazine to normal position.

12. In an automatic phonograph, the combination of a turntable, mechanism operated by an electric motor for delivering records to the turntable and removing them therefrom, a tone arm pivotally supported to swing across the turntable between the peripheral and central portions thereof, a switch associated with said tone arm and comprising two units the first of which is movable with the tone arm, a lost-motion connection between the units through which the second unit is moved by the first, said units having contact members which are out of engagement with each other when the tone arm is moving toward the center of a record and are brought into engagement with each other upon a slight reverse movement of the tone arm, two additional contact members, one carried by the first unit and the other supported in operative relation thereto and which are brought into engagement with each other when the tone arm is moved to within a given distance of the center of a record, and a circuit including all the aforesaid contact members, the aforesaid motor, and a source of electric energy.

13. In an automatic phonograph that is adapted to be controlled by disk records having runover grooves of the spiral-lead-in type and of the eccentric type, the combination of a turntable, mechanism for delivering records to the turntable and for removing them therefrom, an electric motor for driving said mechanism, a switch associated with the tone arm and comprising two units, the first being movable with the tone arm as it swings between the peripheral and central portions of the turntable, an adjustable lost-motion connection between the first and second units, two contact members carried, respectively, by said members, said contact members being out of engagement when the tone arm is moving toward the center of the record and being adapted to be engaged with each other on a slight reverse movement of the tone arm, a second pair of contact members, one of which is carried by the first unit and the other being supported in operative relation thereto, the first mentioned pair of contact members being intermittently engaged by an oscillatory movement imparted to the tone arm by the eccentric runover groove of a record and the other contact members being adapted to be brought into engagement when the tone arm is swung inwardly by a spiral-lead-in runover groove of a record, and an electric circuit including said two pairs of contact members, the aforesaid motor, and a source of electric energy.

14. In an automatic phonograph, the combination of a turntable, mechanism operated by an electric motor for delivering records to the turntable and removing them therefrom, a tone arm pivotally supported to swing across the turntable between the peripheral and central portions thereof, and means associated with said tone arm comprising two units the first of which is movable with the tone arm, a lost-motion connection between the two units through which the second unit is moved by the first, a tilting switch maintained in open-circuit condition by said units when the units are in a given relation due to their being moved in a direction resulting from the swinging of the tone arm from the periphery toward the center of the record and which is adapted to be shifted to closed-circuit condition upon the relation of said units being changed by action of the tone arm imparted thereto by a runover groove of a record, and a circuit including said switch, the aforesaid motor, and a source of electric energy.

15. In an automatic phonograph, the combination of a turntable, mechanism operated by an electric motor for delivering records to the turntable and removing them therefrom, a tone arm pivotally supported to swing across the turntable between the peripheral and central portions thereof, and means associated with said tone arm comprising two units the first of which is movable with the tone arm, a lost-motion connection between the two units through which the second unit is moved by the first, a gravity member movably connected to the first mentioned unit and sustained in elevated position by the second mentioned unit when the units are being moved in a direction resulting from the swinging of the tone arm from the periphery toward the center of the record and which is adapted to be disengaged from the second unit upon a slight reverse movement of the first unit resulting from a corresponding movement of the tone arm, a tilting switch carried by the gravity member, and a circuit including said switch, the aforesaid motor and a source of electric energy.

16. In an automatic phonograph, the combination of a turntable, mechanism operated by an electric motor for delivering records to the turntable and removing them therefrom, a tone arm pivotally supported to swing across the turntable between the peripheral and central portions thereof, and means associated with the tone arm comprising two units the first of which is movable with the tone arm, a lost-motion connection between the units through which the second unit is moved by the first, a gravity member movably connected to the first unit and sustained by the second when the first unit is being moved as a result of the swinging of the tone arm from the periphery toward the center of the turntable, means connected to the tone arm for advancing the second unit with respect to the first as the tone arm approaches to within a given distance of the center of the turntable thereby to withdraw the second unit from beneath the gravity member and allow the latter to drop, a tilting switch carried by said gravity member, and a circuit including said switch, the aforesaid motor, and a source of electric energy.

17. In an automatic phonograph that is adapted to be controlled by disk records having runover grooves of the spiral-lead-in type and of the eccentric type, the combination of a turntable, mechanism for delivering records to the turntable and for removing them therefrom, an electric motor for driving said mechanism, and means associated with the tone arm comprising two units, the first being movable with the tone arm as it swings between the peripheral and central portions of the turntable, a lost-motion connection between the first and second units whereby the second unit is caused to be moved by the first after the first has been moved a limited distance in either direction, a gravity member movably connected with the first unit and adapted to be sustained by the second when the second unit is being moved by the first in a direction corresponding to the swinging of the tone arm from the periphery toward the center of the turntable, said gravity member being disengaged from the second unit by the oscillatory motion of the tone arm produced by an eccentric runover groove of a record, means operated by the tone arm for advancing the second unit with respect to the first thereby to dislodge said gravity member from it when the tone arm is moved toward the center of the turntable by a spiral-lead-in runover groove, a tilting switch carried by the gravity member, and an electric circuit including said switch, the aforesaid motor, and a source of electric energy.

18. In an automatic phonograph, the combination of a turntable, a magazine for disk records spaced laterally from the turntable, record feeding means between the turntable and magazine for feeding records back and forth between the two, means supporting the magazine for oscillation between an upright position wherein the records are sustained on edge and two reverse substantially horizontal positions, a main drive shaft, connections between said shaft and the magazine for swinging the latter to first one and then the other of its horizontal positions, mechanism for advancing a record from the magazine, when in one of its horizontal positions, to the feeding means, mechanism for removing a record from the turntable and presenting it to the feeding means when the magazine is in the other of its horizontal positions, and operative connections between said mechanisms and the main drive shaft.

19. In an automatic phonograph, the combination of a turntable, a magazine for disk records spaced laterally from the turntable, record feeding means between the turntable and magazine for feeding records back and forth between the two, means supporting the magazine for oscillation between an upright position wherein the records are sustained on edge and two reverse substantially horizontal positions, stops for arresting movement of the magazine in said positions, a main drive shaft, yielding connections between said shaft and the magazine for swinging the latter into engagement with first one and then the other of said stops, mechanism for advancing a record from the magazine, when in one of its horizontal positions, to the feeding means, mechanism for removing a record from the turntable and presenting it to the feeding means when the magazine is in the other of its horizontal positions, and operative connections between said mechanisms and the main drive shaft.

20. In an automatic phonograph, record rotating means, a record magazine, means for transferring records from one to the other of said means and magazine, an electric motor for driving the record rotating means, a second electric motor for operating the record transferring means, a switch drum, operative connections by which the same is rotated by the second mentioned motor, a contact member in constant electrical connection with said drum, a source of electric energy one side of which is in circuit with said contact member, a second contact member engaging the drum, the drum having a "dead spot" for register therewith, the second mentioned contact member and the second mentioned motor being in circuit with the opposite side of the source of electric energy, a third contact member engaging the switch drum, the latter having a "dead spot" for register therewith, the aforesaid "dead spot" being so arranged as not to register with the respective contact members at the same time, the third mentioned contact member and the first motor being in circuit with the second mentioned side of the source of electric energy, a tone arm associated with the record rotating means, a switch controlled thereby, and a shunt circuit including said switch, the source of electric energy and the second mentioned motor.

21. In an automatic phonograph, record rotating means, a record magazine, means for transferring records from one to the other of said means and magazine, an electric motor for driving the record rotating means, a second electric motor for operating the record transferring means, a switch drum, operative connections by which the same is rotated by the second mentioned motor, a contact member in constant electrical connection with said drum, a source of electric energy one side of which is in circuit with said contact member, a second contact member engaging the drum, the drum having a "dead spot" for register therewith, the second mentioned contact member and the second mentioned motor being in circuit with the opposite side of the source of electric energy, a third contact member engaging the switch drum, the latter having a "dead spot" for register therewith, the aforesaid "dead spots" being so arranged as not to register with the respective contact members at the same time, the third mentioned contact member and the first motor being in circuit with the second mentioned side of the source of electric energy, a tone arm associated with the record rotating means, a switch controlled thereby, and a shunt circuit including said switch, the source of electric energy and the second mentioned motor, a manually operated switch in the circuit of the second mentioned contact member, a fourth contact member engaging the switch drum, said drum having "dead spots" for register with the last mentioned contact member when either of the other "dead spots" is in register with its respective contact member, and a circuit including the fourth contact member, the source of electric energy and the second mentioned motor and by-passing the manually operated switch.

22. In an automatic phonograph, record rotating means, a record magazine, means for transferring records from one to the other of said means and magazine, an electric motor for driving the record rotating means, a second electric motor for operating the record transferring means, a switch drum, operative connections by which the same is rotated by the second mentioned motor, a contact member in constant electrical connection with said drum, a source of electric energy one side of which is in circuit with said contact member, a second contact member engaging the drum, the drum having a "dead spot" for register therewith, the second mentioned contact member and the second mentioned motor being in circuit with the opposite side of the source of electric energy, a third contact member engaging the switch drum, the latter having a "dead spot" for register therewith, the aforesaid "dead spots" being so arranged as not to register with the respective contact members at the same time, the third mentioned contact member and the first motor being in circuit with the second mentioned side of the source of electric energy, a tone arm associated with the record rotating means, a switch controlled thereby, a circuit including said switch, the source of electric energy and the second mentioned motor, and a manually operated switch and its circuit for shunting out the tone arm switch.

THOMAS W. SMALL.
STANTON A. GUEST.